(12) United States Patent
Matsuhara et al.

(10) Patent No.: US 11,302,905 B2
(45) Date of Patent: Apr. 12, 2022

(54) NEGATIVE ELECTRODE OF NONAQUEOUS LITHIUM-ION SECONDARY BATTERY AND NONAQUEOUS LITHIUM-ION SECONDARY BATTERY USING SAME

(71) Applicant: TOYOTA JIDOSHA KABUSHIKI KAISHA, Toyota (JP)

(72) Inventors: Shinsuke Matsuhara, Miyoshi (JP); Hiroto Asano, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 232 days.

(21) Appl. No.: 16/796,382

(22) Filed: Feb. 20, 2020

(65) Prior Publication Data

US 2020/0287201 A1 Sep. 10, 2020

(30) Foreign Application Priority Data

Mar. 4, 2019 (JP) .............................. JP2019038214

(51) Int. Cl.
*H01M 4/133* (2010.01)
*H01M 10/0525* (2010.01)
*H01M 4/58* (2010.01)
*H01M 4/02* (2006.01)

(52) U.S. Cl.
CPC ......... *H01M 4/133* (2013.01); *H01M 4/5825* (2013.01); *H01M 10/0525* (2013.01); *H01M 2004/027* (2013.01); *H01M 2004/028* (2013.01); *H01M 2300/0034* (2013.01)

(58) Field of Classification Search
CPC ......... H01M 10/0525; H01M 10/0568; H01M 2004/027; H01M 2004/028; H01M 2300/0034; H01M 2300/004; H01M 4/133; H01M 4/366; H01M 4/5825; H01M 4/587; H01M 4/62; H01M 4/625
See application file for complete search history.

(56) References Cited

FOREIGN PATENT DOCUMENTS

| JP | 2008041465 A | 2/2008 |
| JP | 2017152337 A | 8/2017 |
| JP | 2018049769 A | 3/2018 |

OTHER PUBLICATIONS

Yutaka Oyama et al.; "Negative Electrode for Lithium Ion Secondary Battery"; U.S. Appl. No. 16/749,729, filed Jan. 22, 2020.

*Primary Examiner* — Carlos Barcena
(74) *Attorney, Agent, or Firm* — Dickinson Wright, PLLC

(57) ABSTRACT

A negative electrode which includes graphite particles and which is capable of imparting superior input resistance characteristics to a nonaqueous lithium-ion secondary battery is provided. The negative electrode of a nonaqueous lithium-ion secondary battery disclosed herein includes graphite particles as negative electrode active materials and a supported material being supported by the graphite particles. The graphite particles have phenolic hydroxy groups. The supported material has surface hydroxy groups. A ratio of an amount B (mmol/g) of the surface hydroxy groups in the supported material to an amount A (mmol/g) of the phenolic hydroxy groups in the graphite particles is 30 or more and 150 or less.

4 Claims, 2 Drawing Sheets

NEGATIVE ELECTRODE OF NONAQUEOUS LITHIUM-ION SECONDARY BATTERY AND NONAQUEOUS LITHIUM-ION SECONDARY BATTERY USING SAME

BACKGROUND OF THE INVENTION

1. Field of the Invention

The present disclosure relates to a negative electrode of a nonaqueous lithium-ion secondary battery. The present disclosure also relates to a nonaqueous lithium-ion secondary battery using the negative electrode. The present application claims priority on the basis of Japanese Patent Application No. 2019-038214 filed in Japan on Mar. 4, 2019, the entire contents of which are incorporated herein by reference.

2. Description of the Related Art

In recent years, nonaqueous lithium-ion secondary batteries are suitably used as portable power supplies of personal computers, portable terminals, and the like as well as vehicle-driving power supplies of electric vehicles (EVs), hybrid vehicles (HVs), plug-in hybrid vehicles (PHVs), and the like.

Generally, a negative electrode active material capable of reversibly storing and releasing lithium ions that are charge carriers is used in a negative electrode of a nonaqueous lithium-ion secondary battery. Typically, graphite is used as the negative electrode active material. In order to improve characteristics of nonaqueous lithium-ion secondary batteries, other substances are being introduced to a surface of graphite (for example, Japanese Patent Application Publication No. 2017-152337, Japanese Patent Application Publication No. 2018-0449769, and Japanese Patent Application Publication No. 2008-041465).

Japanese Patent Application Publication No. 2017-152337 describes lithium ion input/output characteristics and lithium precipitation resistance being improved by covering surfaces of graphite particles with hydrophilic carbon black at a coverage rate of 6.1% or higher and 46.4% or lower. Japanese Patent Application Publication No. 2018-049769 describes charge/discharge rate characteristics being improved by embedding hard particles in surfaces of graphite particles. Japanese Patent Application Publication No. 2008-041465 describes input/output density and cycle characteristics being improved by attaching ceramic nanoparticles to surfaces of graphite particles.

SUMMARY OF THE INVENTION

However, studies conducted by the present inventors reveal that input resistance characteristics are insufficient in prior art using graphite particles described above.

In consideration thereof, an object of the present disclosure is to provide a negative electrode which uses graphite particles and which is capable of imparting superior input resistance characteristics to a nonaqueous lithium-ion secondary battery.

The negative electrode of a nonaqueous lithium-ion secondary battery disclosed herein includes graphite particles as a negative electrode active material and a supported material being supported by the graphite particles. The graphite particles have phenolic hydroxy groups. The supported material has surface hydroxy groups. A ratio of an amount B (mmol/g) of the surface hydroxy groups in the supported material to an amount A (mmol/g) of the phenolic hydroxy groups in the graphite particles is 30 or more and 150 or less.

According to such a configuration, a negative electrode which uses graphite particles and which is capable of imparting superior input resistance characteristics to a nonaqueous lithium-ion secondary battery is provided.

In a desirable aspect of the negative electrode of a nonaqueous lithium-ion secondary battery disclosed herein, the supported material is at least one selected from the group consisting of $SiO_2$, $Al_2O_3$, and carbon black.

According to such a configuration, an effect of improving input resistance characteristics can be obtained more effectively.

The nonaqueous lithium-ion secondary battery disclosed herein includes a positive electrode, the negative electrode described above, and a nonaqueous electrolyte. The nonaqueous electrolyte includes $LiPF_6$ and lithium-bis(fluorosulfonyl)imide.

According to such a configuration, a nonaqueous lithium-ion secondary battery with particularly high input resistance characteristics is provided.

DESCRIPTION OF THE PREFERRED EMBODIMENT

Figure 1:
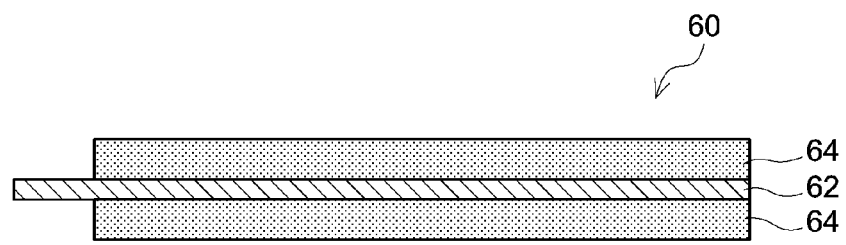
FIG. 1 is a sectional view schematically showing an example of a negative electrode according to an embodiment of the present disclosure.

Hereinafter, an embodiment according to the present disclosure will be described with reference to the drawings. It should be noted that matters (for example, general configurations and general manufacturing processes of negative electrodes and nonaqueous lithium-ion secondary batteries which do not characterize the present disclosure) other than the matter specifically set forth in the present specification and that may be necessary for carrying out the present disclosure may be comprehended as design matters for a person with ordinary skill in the art on the basis of prior art in the relevant field. The present disclosure can be carried out on the basis of the disclosure in the present specification and common general technical knowledge in the relevant field. It should also be noted that dimensional relationships (lengths, widths, thicknesses, and the like) shown in the drawings do not reflect actual dimensional relationships.

In the present specification, a "secondary battery" is a term which describes repetitively chargeable and dischargeable power storage devices in general and which encompasses so-called storage batteries such as a lithium-ion secondary battery and storage elements such as an electrical double layer capacitor.

In addition, in the present specification, a "lithium-ion secondary battery" refers to a secondary battery using lithium ions as charge carriers in which charging and discharging are realized by the movement of charges accompanying lithium ions between a positive electrode and a negative electrode.

Furthermore, in the present disclosure, a "nonaqueous lithium-ion secondary battery" refers to a lithium-ion secondary battery including a nonaqueous electrolyte.

A negative electrode according to the present embodiment includes graphite particles as a negative electrode active material and a supported material being supported by the graphite particles. In other words, a negative electrode material including graphite particles as a negative electrode active material and a supported material being supported by the graphite particles is used in the negative electrode according to the present embodiment.

As the graphite particles, those having an oxygen-containing functional group such as a phenolic hydroxy group, a carboxyl group, and an epoxy group are known. In the present embodiment, the graphite particles have at least phenolic hydroxy groups.

Although not particularly limited, an average particle diameter of the graphite particles is desirably 1 µm or more and 25 µm or less, more desirably 3 µm or more and 20 µm or less, and even more desirably 5 µm or more and 15 µm or less.

It should be noted that, in the present specification, unless otherwise noted, an "average particle diameter" refers to a particle diameter (D50) having a cumulative frequency of 50% in percentage by volume in a particle size distribution measured by a laser diffraction scattering method.

The supported material is a material supported by the graphite particles, and a surface of the graphite particles is modified by the supported material.

The supported material has surface hydroxy groups. Examples of such a material include: metal oxides such as silica ($SiO_2$), alumina ($Al_2O_3$), zirconia, titania, magnesia, ceria, zinc oxide, germanium oxide, indium oxide, tin oxide, and antimony oxide; hydrates of metal oxides such as boehmite; clay minerals such as zeolite; and carbon black. A single one of these materials may be used independently, or two or more of the materials may be used in combination with each other. Given that the effect of the present disclosure is obtained more effectively, the supported material is desirably at least one selected from the group consisting of silica, alumina, and carbon black.

Although not particularly limited, an average particle diameter of the supported material is desirably smaller than the average particle diameter of the graphite particles. The average particle diameter of the supported material is desirably 0.005 µm or more and less than 1 µm and more desirably 0.01 µm or more and 0.8 µm or less.

In the present embodiment, when an amount of the phenolic hydroxy groups in the graphite particles is denoted by A (mmol/g) and an amount of the surface hydroxy groups in the supported material is denoted by B (mmol/g), a ratio B/A is 30 or more and 150 or less. Setting the ratio B/A within this range enables superior input resistance characteristics to be imparted to input resistance of a nonaqueous lithium-ion secondary battery. A reason therefor can be presumed as follows.

During initial charge of a nonaqueous lithium-ion secondary battery, a nonaqueous electrolyte is decomposed on the surfaces of graphite particles and a solid electrolyte interface (SEI) film is formed. Despite having functions such as suppressing further decomposition of the nonaqueous electrolyte, the SEI film is a resistive element. Therefore, when the nonaqueous electrolyte is excessively decomposed and the SEI film is formed in excess, resistance rises. However, it is considered that, by appropriately controlling the amount A of the phenolic hydroxy groups of the graphite particles and the amount B of the surface hydroxy groups in the supported material, such excessive decomposition of the nonaqueous electrolyte is suppressed and resistance can be reduced. In addition, it is also considered that promotion of dissociation of a supporting salt by the surface hydroxy groups of the supported material also contributes toward reducing resistance.

Although not particularly limited, the amount A of the phenolic hydroxy groups in the graphite particles is desirably 0.2 mmol/g or more and 1.0 mmol/g or less, more desirably 0.3 mmol/g or more and 0.7 mmol/g or less, and even more desirably 0.4 mmol/g or more and 0.6 mmol/g or less.

Although not particularly limited, the amount B of the surface hydroxy groups in the supported material is desirably 6 mmol/g or more and 150 mmol/g or less, more desirably 9 mmol/g or more and 105 mmol/g or less, and even more desirably 12 mmol/g or more and 90 mmol/g or less.

It should be noted that the amount A of the phenolic hydroxy groups in the graphite particles can be measured according to known methods, and for example, the amount A of the phenolic hydroxy groups in the graphite particles can be measured by the Boehm method.

In addition, the amount B of the surface hydroxy groups in the supported material can be measured according to known methods. For example, with respect to a substance which is the same as the supported material and of which a surface hydroxy group amount is known, an FT-IR measurement is carried out and a calibration curve is prepared with respect to an intensity of a peak based on vibrations of —OH (for example, a peak near 3,600 $cm^{-1}$) and the surface hydroxy group amount. With respect to the supported material, an FT-IR measurement is carried out, and an intensity of a peak based on vibrations of —OH is obtained. Then, a hydroxy group amount is specified using a calibration curve thereof.

Although not particularly limited, a mass ratio of the graphite particles and the supported material (graphite particles:supported material) desirably ranges from 99:1 to 70:30 and more desirably ranges from 95:5 to 90:10.

Although not particularly limited, a method of causing the graphite particles to support the supported material desirably involves allowing the graphite particles to support the supported material by a mechanical milling method.

Typically, the negative electrode according to the present embodiment has a negative electrode current collector and a negative electrode active material layer supported by the negative electrode current collector.

As the negative electrode current collector, a conductive member constituted by a metal with favorable conductivity (for example, copper, nickel, titanium, or stainless steel) can be desirably used in a similar manner to conventional lithium-ion secondary batteries. Among such conductive members, a copper member is particularly desirable.

There are no particular limitations on the shape of the negative electrode current collector since the shape may vary in accordance with the shape and the like of the lithium-ion secondary battery constructed using the obtained negative electrode, and the negative electrode current collector may be in various forms such as rod-shaped, plate-shaped, sheet-shaped, foil-shaped, or mesh-shaped forms. Desirable negative electrode current collector is a foil-shaped one.

The negative electrode active material layer contains the negative electrode material including graphite particles and a supported material being supported by the graphite particles. In addition to the negative electrode material, the negative electrode active material layer may contain a binder, a thickener, or the like.

Examples of the binder include styrene-butadiene rubber (SBR) and modified materials thereof, acrylonitrile-butadiene rubber and modified materials thereof, acrylic rubber and modified materials thereof, and fluororubbers. Among these rubbers, SBR is desirable.

Examples of the thickener include: a cellulose based polymer such as carboxymethyl cellulose (CMC), methyl cellulose (MC), cellulose acetate phthalate (CAP), and hydroxypropyl methyl cellulose (HPMC); and polyvinyl alcohol (PVA). Among these materials, CMC is desirable.

Although not particularly limited, a content by percentage of the negative electrode material in the negative electrode active material is desirably 70% by mass or higher, more desirably 80% by mass or higher, and even more desirably 90% by mass or higher.

Although not particularly limited, a content by percentage of the binder in the negative electrode active material is desirably 0.1% by mass or higher and 8% by mass or lower, more desirably 0.2% by mass or higher and 3% by mass or lower, and more desirably 0.3% by mass or higher and 2% by mass or lower.

Although not particularly limited, a content by percentage of the thickener in the negative electrode active material is desirably 0.3% by mass or higher and 3% by mass or lower and more desirably 0.4% by mass or higher and 2% by mass or lower.

Shapes and dimensions of the negative electrode current collector and the negative electrode active material layer are not particularly limited and may be determined as deemed appropriate in accordance with a design of the nonaqueous lithium-ion secondary battery. The shapes and the dimensions of the negative electrode current collector and the negative electrode active material layer may be similar to known shapes and dimensions.

The negative electrode according to the present embodiment can be fabricated according to known methods. For example, the negative electrode can be fabricated by applying a negative electrode paste including the negative electrode material, the binder, and the thickener described above and a solvent (for example, water) on the negative electrode current collector, drying the negative electrode paste and, if necessary, pressing the resultant.

FIG. 1 shows a configuration example of the negative electrode according to the present embodiment. Specifically, FIG. 1 schematically shows a cross section of a negative electrode 60 according to the present example.

The negative electrode 60 has a negative electrode current collector 62 and a negative electrode active material layer 64 provided on the negative electrode current collector 62. While the negative electrode active material layer 64 is provided on both primary surfaces of the negative electrode current collector 62, alternatively, the negative electrode active material layer 64 may only be provided on one of the primary surfaces of the negative electrode current collector 62.

Copper foil is used as the negative electrode current collector 62. A thickness of the copper foil is, for example, 6 μm or more and 30 μm or less.

The negative electrode active material layer 64 contains the negative electrode material described above. Therefore, the negative electrode material includes graphite particles and a supported material being supported by the graphite particles. The graphite particles have phenolic hydroxy groups and the supported material has surface hydroxy groups. An amount of the phenolic hydroxy groups and an amount of the surface hydroxy groups are within the specific range described earlier.

The negative electrode active material layer 64 contains SBR as a binder and CMC as a thickener.

A nonaqueous lithium-ion secondary battery including the negative electrode according to the present embodiment has superior input resistance characteristics. Specifically, the nonaqueous lithium-ion secondary battery has low input resistance.

Hereinafter, a configuration example provided with a nonaqueous lithium-ion secondary battery including the negative electrode according to the present embodiment will be described with reference to FIGS. 2 and 3.

Figure 2:
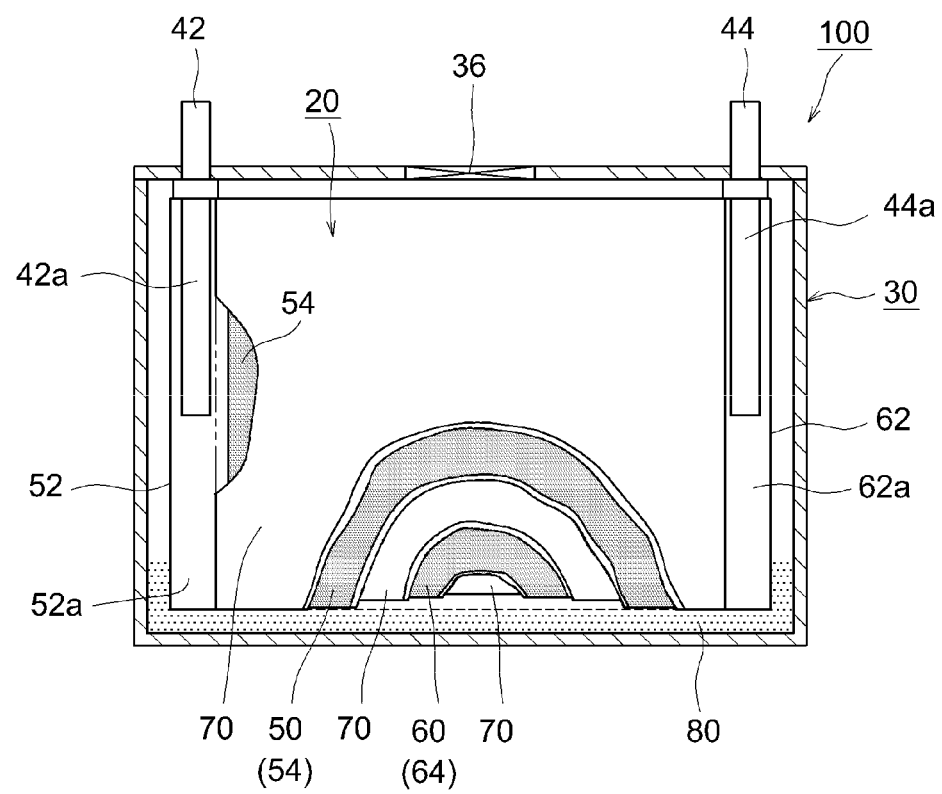
FIG. 2 is a sectional view schematically showing an internal structure of a nonaqueous lithium-ion secondary battery including the negative electrode according to the embodiment of the present disclosure.

A nonaqueous lithium-ion secondary battery 100 (hereinafter, simply described as a "lithium-ion secondary battery 100") shown in FIG. 2 is a sealed battery constructed by housing a flat-shaped wound electrode body 20 and a nonaqueous electrolyte 80 in a flat square battery case (in other words, an outer container) 30. The battery case 30 is provided with a positive electrode terminal 42 and a negative electrode terminal 44 for external connection and a thin safety valve 36 configured so as to release internal pressure of the battery case 30 when the internal pressure rises to or exceeds a prescribed level. The battery case 30 is also provided with an electrolyte injection hole (not illustrated) for injecting the nonaqueous electrolyte 80. The positive electrode terminal 42 is electrically connected to a positive electrode current collecting plate 42a. The negative electrode terminal 44 is electrically connected to a negative electrode current collecting plate 44a. As a material of the battery case 30, for example, a lightweight metallic material with good thermal conductivity such as aluminum is used.

Figure 3:
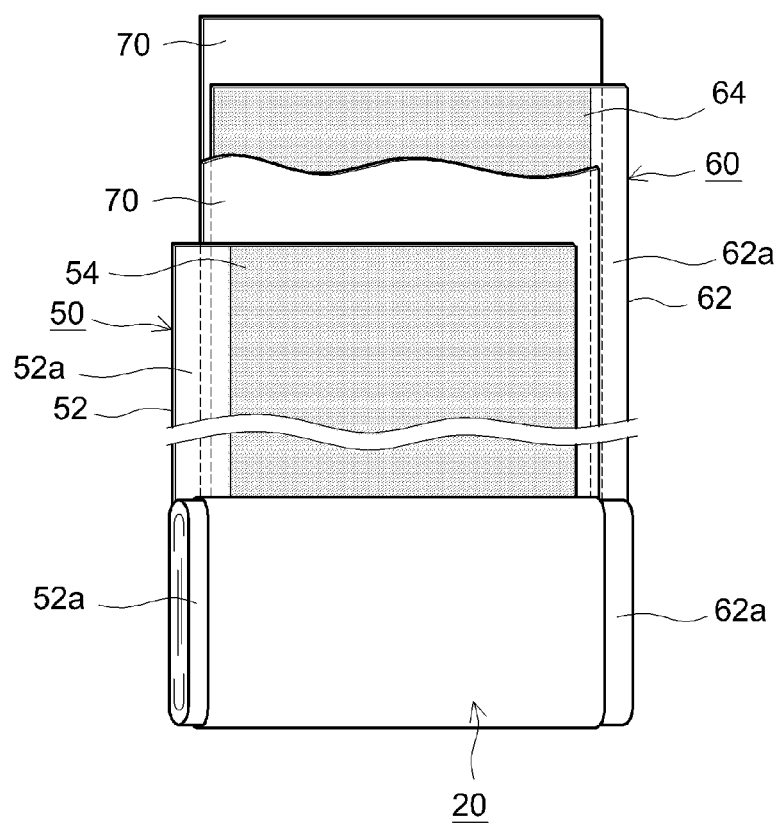
FIG. 3 is a schematic view showing a configuration of a wound electrode body of the nonaqueous lithium-ion secondary battery shown in FIG. 2.

As shown in FIGS. 2 and 3, the wound electrode body 20 has a form in which a positive electrode sheet 50 having a positive electrode active material layer 54 formed in a lengthwise direction on one surface or both surfaces (in this case, both surfaces) of an elongated positive electrode current collector 52 and a negative electrode sheet 60 having the negative electrode active material layer 64 formed in the lengthwise direction on one surface or both surfaces (in this case, both surfaces) of the elongated negative electrode current collector 62 are laminated via two elongated separator sheets 70 and wound in the lengthwise direction. The positive electrode current collecting plate 42a and the negative electrode current collecting plate 44a are respectively joined to a positive electrode active material layer unformed portion 52a (in other words, a portion where the positive electrode active material layer 54 has not been formed and the positive electrode current collector 52 is exposed) and a negative electrode active material layer unformed portion 62a (in other words, a portion where the negative electrode active material layer 64 has not been formed and the negative electrode current collector 62 is exposed) which are formed so as to protrude outward from both ends in a winding axis direction (in other words, a sheet width direction that is perpendicular to the lengthwise direction) of the wound electrode body 20.

Examples of the positive electrode current collector 52 constituting the positive electrode sheet 50 include an aluminum foil. Examples of the positive electrode active material included in the positive electrode active material layer 54 include lithium transition metal oxides (for example, $LiNi_{1/3}Co_{1/3}Mn_{1/3}O_2$, $LiNiO_2$, $LiCoO_2$, $LiFeO_2$, $LiMn_2O_4$, and $LiNi_{0.5}Mn_{1.5}O_4$) and lithium transition metal phosphate compounds (for example, $LiFePO_4$). The positive electrode active material layer 54 may contain components other than the active material such as a conductive material or a binder. As the conductive material, carbon black such as acetylene black (AB) and other carbon material (such as graphite) may be desirably used. As the binder, polyvinylidene fluoride (PVdF) or the like may be used.

In the negative electrode sheet 60, the negative electrode according to the embodiment described above is used and, in this case, the negative electrode 60 (in other words, the negative electrode 60 including the negative electrode current collector 62 and the negative electrode active material layer 64 provided on the negative electrode current collector 62) configured as illustrated in FIG. 1 is used.

Examples of the separator 70 include a porous sheet (film) made of a resin such as polyethylene (PE), polypropylene (PP), polyester, cellulose, or polyamide. The porous sheet may have a single layer structure or a laminate structure of two or more layers (for example, a three-layered structure in which a PP layer is laminated on both sides of a PE layer). A heat-resistant layer (HRL) may be provided on a surface of the separator 70.

As the nonaqueous electrolyte 80, a nonaqueous electrolyte the same as or similar to those used in conventional lithium-ion secondary batteries can be used and, typically, a nonaqueous electrolyte in which a supporting salt is contained in an organic solvent (a nonaqueous solvent) can be used.

As the nonaqueous solvent, various organic solvents such as carbonates, ethers, esters, nitriles, sulfones, and lactones which are used in an electrolyte solution of a general lithium-ion secondary battery can be used without particular limitations. Among such solvents, carbonates are particularly favorable, and examples thereof include ethylene carbonate (EC), propylene carbonate (PC), diethyl carbonate (DEC), dimethyl carbonate (DMC), and ethyl methyl carbonate (EMC). A single one of these nonaqueous solvents may be used independently, or two or more of the nonaqueous solvents may be used in combination with each other.

As the supporting salt, for example, a lithium salt such as $LiPF_6$, $LiBF_4$, lithium-bis(fluorosulfonyl)imide (LiFSI), and lithium-bis(trifluoromethane)sulfonimide (LiTFSI) can be desirably used. A single one of these supporting salts may be used independently, or two or more of the supporting salts may be used in combination with each other. In light of a higher effect of improving input resistance characteristics, the supporting salt desirably includes both $LiPF_6$ and LiFSI. A higher effect of reducing input resistance obtained by using $LiPF_6$ and LiFSI in combination as the supporting salt is conceivably because an effect of promoting dissociation of the supporting salt by the surface hydroxy groups of the supported material is enhanced. When using a combination of $LiPF_6$ and LiFSI as the supporting salt, a molar ratio of $LiPF_6$ and LiFSI ($LiPF_6$:LiFSI) desirably ranges from 0.01:0.99 to 0.99:0.01, more desirably ranges from 0.05:0.95 to 0.95:0.05, and even more desirably ranges from 0.05:0.95 to 0.60:0.40.

A concentration of the supporting salt is desirably 0.7 mol/L or higher and 1.3 mol/L or lower.

It should be noted that, as long as the effect of the present disclosure is not significantly impaired, the nonaqueous electrolyte 80 described above may contain various additives including: gas generating agents such as biphenyl (BP) and cyclohexylbenzene (CHB); film-forming agents such as oxalate complex compounds including boron atoms and/or phosphorus atoms, and vinylene carbonate (VC); dispersants; and thickeners.

The lithium-ion secondary battery 100 configured as described above can be used in various applications. Desirable applications include a driving power supply mounted to a vehicle such as an electric vehicle (EV), a hybrid vehicle (HV), or a plug-in hybrid vehicle (PHV). The lithium-ion secondary battery 100 may also be used in the form of a battery pack typically formed by connecting a plurality of the lithium-ion secondary batteries 100 in series and/or in parallel.

The square lithium-ion secondary battery 100 including the flat-shaped wound electrode body 20 has been described as an example. However, a lithium-ion secondary battery can also be configured as a lithium-ion secondary battery including a stacked-type electrode body. In addition, a lithium-ion secondary battery can also be configured as a cylindrical lithium-ion secondary battery, a laminated lithium-ion secondary battery, and the like.

Although the following provides an explanation of several examples related to the present disclosure, the present disclosure is not intended to be limited by the contents indicated in these examples.

Example 1

Fabrication of Negative Electrode

As the negative electrode active material, graphite particles with a phenolic hydroxy group amount of 0.5 mmol/g and an average particle diameter (D50) of 10 μm were mixed with $SiO_2$ with a surface hydroxy group amount of 15 mmol/g and an average particle diameter (D50) of 0.5 μm as a supported material. A mixing ratio of the graphite particles and $SiO_2$ by mass was graphite particles:$SiO_2$=90:10. By subjecting the mixture to mechanical milling treatment, a negative electrode material in which $SiO_2$ is supported by the graphite particles was fabricated.

A negative electrode paste was prepared by mixing the fabricated negative electrode material described above, SBR as a binder, and CMC as a thickener with deionized water at a mass ratio of (graphite particles in negative electrode material):SBR:CMC=99:0.5:0.5. The negative electrode paste was applied on both surfaces of an elongated copper foil (a negative electrode current collector) with a thickness of 10 μm and dried, and subsequently pressed to a prescribed thickness to fabricate a negative electrode sheet having a negative electrode active material layer on both surfaces of the negative electrode current collector.

Fabrication of Evaluation Lithium-Ion Secondary Battery

An evaluation lithium-ion secondary battery was fabricated using the fabricated negative electrode described above.

Specifically, $LiNi_{1/3}Mn_{1/3}Co_{1/3}O_2$ (LNCM) with an average particle diameter of 5 μm as a positive electrode active material, acetylene black (AB) as a conductive material, and polyvinylidene fluoride (PVdF) as a binder were fed in a kneader so that the materials had a mass ratio of LNCM:AB:PVdF=92:5:3, and a positive electrode paste was prepared by kneading the mixture while adjusting viscosity using N-methyl-2-pyrrolidone (NMP). The positive electrode paste was applied on both surfaces of an elongated aluminum foil (a positive electrode current collector) with a thickness of 15 μm and dried, and subsequently pressed to a prescribed thickness to fabricate a positive electrode sheet having a positive electrode active material layer on both surfaces of the positive electrode current collector.

A separator in which a heat-resistant layer with a thickness of 4 μm is provided on one surface of a resin porous film with a three-layer structure of PP/PE/PP and a thickness of 24 μm was prepared.

The fabricated positive electrode sheet described above, the fabricated negative electrode sheet described above, and two separators were laminated and wound, and subsequently pressed and squashed from a side surface direction to fabricate a flat-shape wound electrode body. Next, a positive electrode terminal and a negative electrode terminal connected to a case lid were welded to the wound electrode body and the wound electrode body was inserted into a box-like battery case main body having an electrolyte injection hole. The case lid and the battery case main body were then welded together and sealed.

Next, a nonaqueous electrolyte was injected from the electrolyte injection hole of the battery case and the electrolyte injection hole was hermetically sealed by tightening a sealing screw into the electrolyte injection hole. As the nonaqueous electrolyte, a nonaqueous electrolyte prepared by dissolving $LiPF_6$ as a supporting salt at a concentration of 1.0 mol/L into a mixed solvent containing ethylene carbonate (EC), dimethyl carbonate (DMC), and ethyl methyl carbonate (EMC) at a volume ratio of EC:DMC:EMC=3:3:4 was used.

After allowing the battery to stand for a prescribed period of time so that the nonaqueous electrolyte impregnates the wound electrode body, the battery was charged and then aged at 60° C.

The evaluation lithium-ion secondary battery according to example 1 was obtained in this manner.

Comparative Example 1

With the exception of using, as-is, graphite particles with a phenolic hydroxy group amount of 0.5 mmol/g and an average particle diameter (D50) of 10 μm in place of the negative electrode material, a negative electrode sheet and an evaluation lithium-ion secondary battery using the negative electrode were fabricated in a similar manner to example 1.

Comparative Example 2

With the exception of changing the graphite particles used to graphite particles with a phenolic hydroxy group amount of 0.05 mmol/g and an average particle diameter (D50) of 10 μm and changing the supported material used to $SiO_2$ with a surface hydroxy group amount of 8 mmol/g and an average particle diameter (D50) of 0.5 μm, a negative electrode sheet and an evaluation lithium-ion secondary battery using the negative electrode were fabricated in a similar manner to example 1.

Comparative Example 3

With the exception of changing the supported material used to $SiO_2$ with a surface hydroxy group amount of 8 mmol/g and an average particle diameter (D50) of 0.5 μm, a negative electrode sheet and an evaluation lithium-ion secondary battery using the negative electrode were fabricated in a similar manner to example 1.

Comparative Example 4

With the exception of changing the supported material used to carbon black with a surface hydroxy group amount of 14 mmol/g and an average particle diameter (D50) of 0.4 μm, a negative electrode sheet and an evaluation lithium-ion secondary battery using the negative electrode were fabricated in a similar manner to example 1.

Example 2

With the exception of changing the supported material used to $SiO_2$ with a surface hydroxy group amount of 50 mmol/g and an average particle diameter (D50) of 0.5 μm, a negative electrode sheet and an evaluation lithium-ion secondary battery using the negative electrode were fabricated in a similar manner to example 1.

Example 3

With the exception of changing the supported material used to $SiO_2$ with a surface hydroxy group amount of 75 mmol/g and an average particle diameter (D50) of 0.5 μm, a negative electrode sheet and an evaluation lithium-ion secondary battery using the negative electrode were fabricated in a similar manner to example 1.

Example 4

With the exception of changing the supported material used to $Al_2O_3$ with a surface hydroxy group amount of 50 mmol/g and an average particle diameter (D50) of 0.3 μm, a negative electrode sheet and an evaluation lithium-ion secondary battery using the negative electrode were fabricated in a similar manner to example 1.

Example 5

With the exception of changing the supported material used to carbon black with a surface hydroxy group amount of 48 mmol/g and an average particle diameter (D50) of 0.4 μm, a negative electrode sheet and an evaluation lithium-ion secondary battery using the negative electrode were fabricated in a similar manner to example 1.

Comparative Example 5

With the exception of using the negative electrode fabricated in comparative example 1 and using $LiPF_6$ and lithium-bis(fluorosulfonyl)imide (LiFSI) at a molar ratio of 0.5:0.5 as a supporting salt to be added to the nonaqueous electrolyte at a concentration of 1.0 mol/L, an evaluation lithium-ion secondary battery was fabricated in a similar manner to example 1.

Comparative Example 6

With the exception of using the negative electrode fabricated in comparative example 3 and using $LiPF_6$ and LiFSI at a molar ratio of 0.5:0.5 as a supporting salt to be added to the nonaqueous electrolyte at a concentration of 1.0 mol/L, an evaluation lithium-ion secondary battery was fabricated in a similar manner to example 1.

Comparative Example 7

With the exception of using the negative electrode fabricated in comparative example 1 and using LiFSI as a supporting salt to be added to the nonaqueous electrolyte at a concentration of 1.0 mol/L, an evaluation lithium-ion secondary battery was fabricated in a similar manner to example 1.

Example 6

With the exception of using the negative electrode fabricated in example 2 and using LiPF$_6$ and LiFSI at a molar ratio of 0.95:0.05 as a supporting salt to be added to the nonaqueous electrolyte at a concentration of 1.0 mol/L, an evaluation lithium-ion secondary battery was fabricated in a similar manner to example 1.

Example 7

With the exception of using the negative electrode fabricated in example 2 and using LiPF$_6$ and LiFSI at a molar ratio of 0.5:0.5 as a supporting salt to be added to the nonaqueous electrolyte at a concentration of 1.0 mol/L, an evaluation lithium-ion secondary battery was fabricated in a similar manner to example 1.

Example 8

With the exception of using the negative electrode fabricated in example 2 and using LiPF$_6$ and LiFSI at a molar ratio of 0.05:0.95 as a supporting salt to be added to the nonaqueous electrolyte at a concentration of 1.0 mol/L, an evaluation lithium-ion secondary battery was fabricated in a similar manner to example 1.

Example 9

With the exception of using the negative electrode fabricated in example 2 and using LiFSI as a supporting salt to be added to the nonaqueous electrolyte at a concentration of 1.0 mol/L, an evaluation lithium-ion secondary battery was fabricated in a similar manner to example 1.

Evaluation of Input Characteristics

After adjusting the fabricated evaluation lithium-ion secondary batteries to a state of charge of SOC 60%, the evaluation lithium-ion secondary batteries were placed in an environmental atmosphere of −10° C. An input value (W=V (voltage)×A (current)) of the batteries was measured while setting a cutoff voltage to 4.2 V. Based on the input value of comparative example 1 as 100, ratios of input values of other comparative examples and examples were obtained. Results thereof are shown in Table 1. A smaller input value ratio signifies lower input resistance.

TABLE 1

| | Graphite particles | Supported material | | | Nonaqueous electrolyte | | |
|---|---|---|---|---|---|---|---|
| | Hydroxy group amount A (mmol/g) | Type | Hydroxy group amount B (mmol/g) | B/A ratio | LiPF6 concentration (mol/L) | LiFSI concentration (mol/L) | Input ratio |
| Comparative example 1 | — | None | — | — | 1 | 0 | 100 |
| Comparative example 2 | 0.05 | SiO2 | 8 | 160 | 1 | 0 | 102 |
| Comparative example 3 | 0.5 | SiO2 | 8 | 16 | 1 | 0 | 102 |
| Example 1 | 0.5 | SiO2 | 15 | 30 | 1 | 0 | 96 |
| Example 2 | 0.5 | SiO2 | 50 | 100 | 1 | 0 | 94 |
| Example 3 | 0.5 | SiO2 | 75 | 150 | 1 | 0 | 97 |
| Example 4 | 0.5 | Al2O3 | 50 | 100 | 1 | 0 | 93 |
| Comparative example 4 | 0.5 | Carbon black | 14 | 28 | 1 | 0 | 101 |
| Example 5 | 0.5 | Carbon black | 48 | 96 | 1 | 0 | 91 |
| Example 6 | 0.5 | SiO2 | 50 | 100 | 0.95 | 0.05 | 88 |
| Example 7 | 0.5 | SiO2 | 50 | 100 | 0.5 | 0.5 | 84 |
| Comparative example 5 | 0.5 | None | — | — | 0.5 | 0.5 | 102 |
| Comparative example 6 | 0.5 | SiO2 | 8 | 16 | 0.5 | 0.5 | 99 |
| Example 8 | 0.5 | SiO2 | 50 | 100 | 5 | 0.95 | 85 |
| Comparative example 7 | 0.5 | None | — | — | 0 | 1 | 99 |
| Example 9 | 0.5 | SiO2 | 50 | 100 | 0 | 1 | 89 |

Comparisons of comparative examples 1 to 3 and examples 1 to 3 reveal that input characteristics are improved when a ratio of an amount B (mmol/g) of the surface hydroxy groups in SiO$_2$ to an amount A (mmol/g) of the phenolic hydroxy groups in the graphite particles is 30 or more and 150 or less.

In addition, results of example 4, example 5, and comparative example 4 show that the effect is obtained even when a type of the supported material is changed as long as the B/A ratio is 30 or more and 150 or less.

Furthermore, results of examples 6 to 9 and comparative examples 5 to 7 reveal that an effect of improving input characteristics is further enhanced when using both LiPF$_6$ and LiFSI as the supporting salt of the nonaqueous electrolyte. Moreover, results of examples 6 and 8 show that the effect of improving input characteristics is exhibited even when a molar ratio of one of LiPF$_6$ and LiFSI is as small as 0.05 mol.

As described above, it is understood that the negative electrode according to the present embodiment enables superior input resistance characteristics to be imparted to a nonaqueous lithium-ion secondary battery.

While specific examples of the present disclosure have been described in detail, such specific examples are merely illustrative and are not intended to limit the scope of claims. Techniques described in the scope of claims include various modifications and changes made to the specific examples illustrated above.

What is claimed is:

1. A negative electrode of a nonaqueous lithium-ion secondary battery, comprising:
   graphite particles as negative electrode active materials; and
   a supported material being supported by the graphite particles, wherein
   the graphite particles have phenolic hydroxy groups,
   the supported material has surface hydroxy groups, and a ratio of an amount B (mmol/g) of the surface hydroxy groups in the supported material to an amount A (mmol/g) of the phenolic hydroxy groups in the graphite particles is 30 or more and 150 or less.

2. The negative electrode of a nonaqueous lithium-ion secondary battery according to claim 1, wherein
the supported material is at least one selected from the group consisting of $SiO_2$, $Al_2O_3$, and carbon black.

3. A nonaqueous lithium-ion secondary battery comprising:
a positive electrode;
the negative electrode according to claim 1; and
a nonaqueous electrolyte, wherein
the nonaqueous electrolyte includes $LiPF_6$ and lithium-bis(fluorosulfonyl)imide.

4. A nonaqueous lithium-ion secondary battery comprising:
a positive electrode;
the negative electrode according to claim 2; and
a nonaqueous electrolyte, wherein
the nonaqueous electrolyte includes $LiPF_6$ and lithium-bis(fluorosulfonyl)imide.

* * * * *